United States Patent [19]

Komatsu et al.

[11] 3,971,528

[45] July 27, 1976

[54] AUTOMATIC STOP DEVICE FOR TAPE RECORDERS

[75] Inventors: Fumito Komatsu, Suwa; Sinkichi Yazima, Chino, both of Japan

[73] Assignee: Kabushiki Kaisha Sankyo Seiki Seisakusho, Nagano, Japan

[22] Filed: Feb. 24, 1975

[21] Appl. No.: 552,719

[30] Foreign Application Priority Data

Feb. 22, 1974 Japan.................................. 49-21594

[52] U.S. Cl.................................... 242/191; 360/74
[51] Int. Cl.²..................... B65H 59/38; G03B 1/02; G11B 15/13
[58] Field of Search............................ 242/189–191; 360/71, 74

[56] References Cited

UNITED STATES PATENTS 3,637,163  1/1972  Apitz............................... 242/191

*Primary Examiner*—Leonard D. Christian
*Attorney, Agent, or Firm*—Haseltine, Lake & Waters

[57] ABSTRACT

An automatic stop device for tape recorders, particularly an automatic stop device which detects the stop of a so-called tape feeding member, such as a tape winding and tape rewinding member, thereby causing a striking member incorporated in a fly-wheel to protrude so that the member protrudes and releases a release member of a push button arrangement, and whereby the striking member is pulled back after the release member has been released.

10 Claims, 16 Drawing Figures

AUTOMATIC STOP DEVICE FOR TAPE RECORDERS

BACKGROUND OF THE INVENTION

1. Field of the Invention

The present invention is related to an automatic stop device for tape recorders and particularly to an automatic stop device which detects the stop of a so-called tape feeding member such as tape winding and tape rewinding thereby causing the striking member incorporated in the fly-wheel to be protruded so that said member protrudes and releases the release member of the push button means and the striking member is pulled back after the release member has been released.

2. Description of the Prior Art

The applicant has already proposed the automatic stop device of this type in the U.S. Ser. No. 504,716, West German Ser. No. 2443434, 7430556 and Dutch Ser. No. 74.12007.

However, the automatic stop device according to the above-mentioned prior art is composed of a number of parts which are contained in the housing being related to the drive member such as fly-wheel, and requires clumsy assembling operation and resulting in complicated construction and expensive manufacturing cost.

In addition, losses of torque becomes considerably large among the parts composing the device and requires another means for preventing such torque losses.

SUMMARY OF THE INVENTION

Therefore, it is an object of the present invention to provide an automatic stop device as proposed by the applicant as mentioned above but in which a clutch is directly formed on the striking member itself, for the purpose of greatly reducing the number of parts to ease the assembling operation and to simplify the construction, thereby greatly reducing torque losses, and further in which after the clutch is disconnected, the striking member is protruded directly thereby contributing to quicken response of the release member of the push-button means until it is released after the tape feeding member has been stopped, to thereby enhance the operation accuracy.

Another object of the present invention is to provide an automatic stop device in which means of engaging the clutches is always energized to disengage the said clutches, thereby reducing the load torque at least when the clutches are being disconnected.

A further object of the present invention is to provide an automatic stop device in which, with reference to the relation between the clutch on the striking member and other clutch engageable therewith, said striking member is made tilted to be always energized to protrude by itself, thereby dispensing with the means of giving protruding force to the striking member.

Still another object of the present invention is to provide an automatic stop device in which the striking member is restrained from being protruded when the tape is being fed, and said restrain is released utilizing the slip between the detector wheel and the drive member when the tape feeding is finished, thereby eliminating erroneous operation from the detecting operation up to the release operation.

Yet another object of the present invention is to provide an automatic stop device in which a permanent magnet is provided on the striking member and a permanent magnet of the same polarity is mounted on the drive member or on the member which rotates together with said drive member, to reduce the space requirement, to stabilize the releasing force of the striking member and to simplify the assembling operation and design, thereby eliminating the necessity of adjusting postion relations.

Still further object of the present invention is to provide an automatic stop device in which is provided a restricting member to which will come into contact the striking member which is protruded from the drive member or from the member rotating together with said drive member when said striking member is retrieved upon collision with the release member thereby defining said restriction position as a retrieved position of the striking member, in order that the protruding and retrieving operation of the striking member is made accurate.

Yet further object of the present invention is to provide an automatic stop device in which the striking member is pulled by the attraction of the permanent magnet at a position at which said striking member comes into contact with said restriction member, thereby attaining the afore-mentioned objects and to simplify the assembling operation, to make sure the operation and to reduce the space economy.

Still another object of the present invention is to provide an automatic stop device in which said pulling operation of the striking member is effected by the permanent magnet which is provided on the striking member and the permanent magnet of an opposite polarity facing thereto.

More further objective of the present invention is to provide an automatic stop device in which an appropriate magnetic material other than the permanent magnet is opposed to the permanent magnet which is provided on the striking member, thereby employing only a single permanent magnet to reduce the manufacturing cost and to simplify the adjustment of positions.

Still more further object of the present invention is to provide an automatic stop device in which a magnetic material is mounted on the striking member and opposed to the permanent magnet, to reduce the weight of the striking member and to quicken the movement of the striking member for the purpose of enhancing response characteristics.

More another object of the present invention is to provide an automatic stop device in which the action of energizing protrusion and retrieval of the striking member is effected utilizing the resilient force of the resilient member, to reduce manufacturing cost and to contribute to the economy.

BRIEF DESCRIPTION OF THE DRAWINGS

FIG. 6 II is a cross-sectional block diagram of line B—B of FIG. 5; and

FIG. 6 III, IV, V and VI are block diagrams showing the operation conditions.

DETAILED DESCRIPTION OF THE PREFERRED EMBODIMENT

Figure 1:
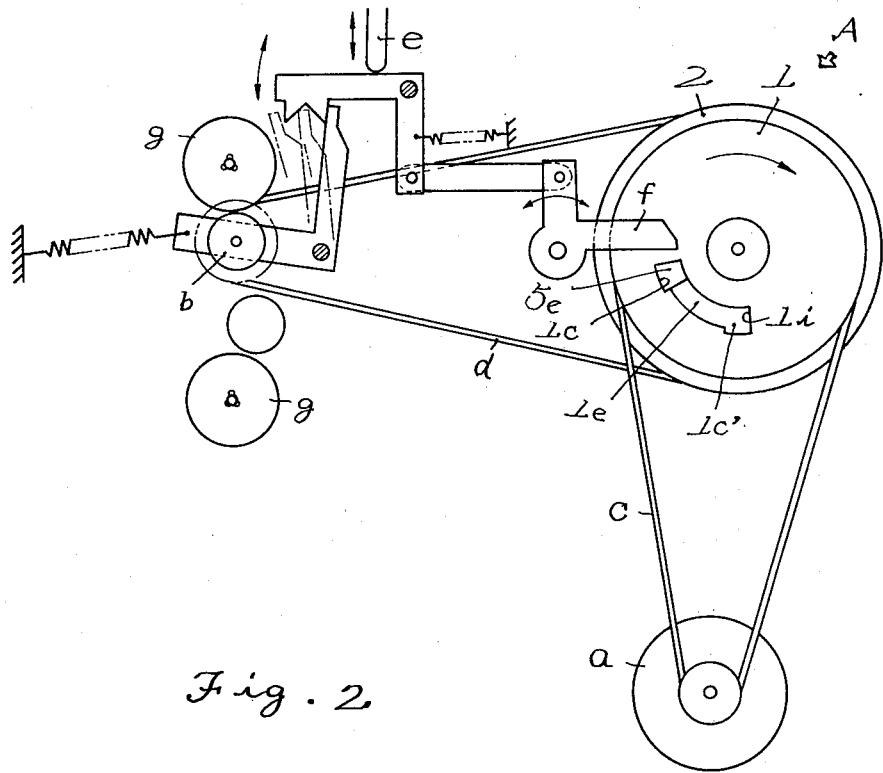
FIG. 1 is a schematic plan view showing an embodiment of the automatic stop device of the present invention.

FIG. 1 is a schematic view of a tape recorder mounting the device (A) of the present invention.

Figure 2:
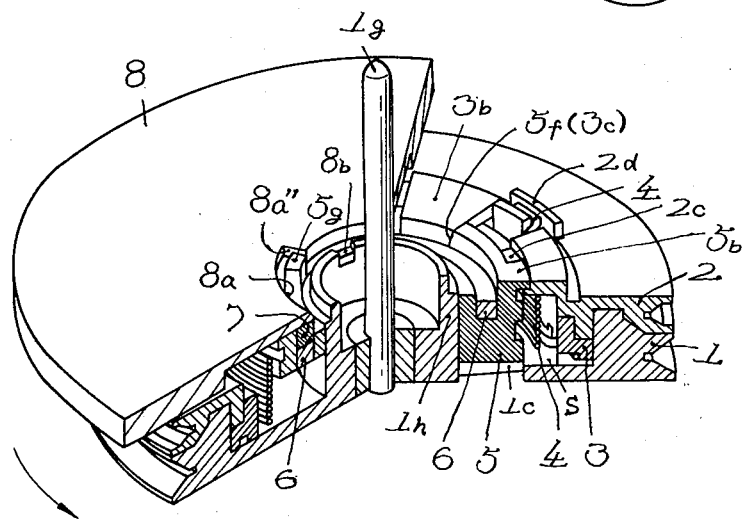
FIG. 2 is a partially cutaway perspective view showing major parts.
Figure 3:
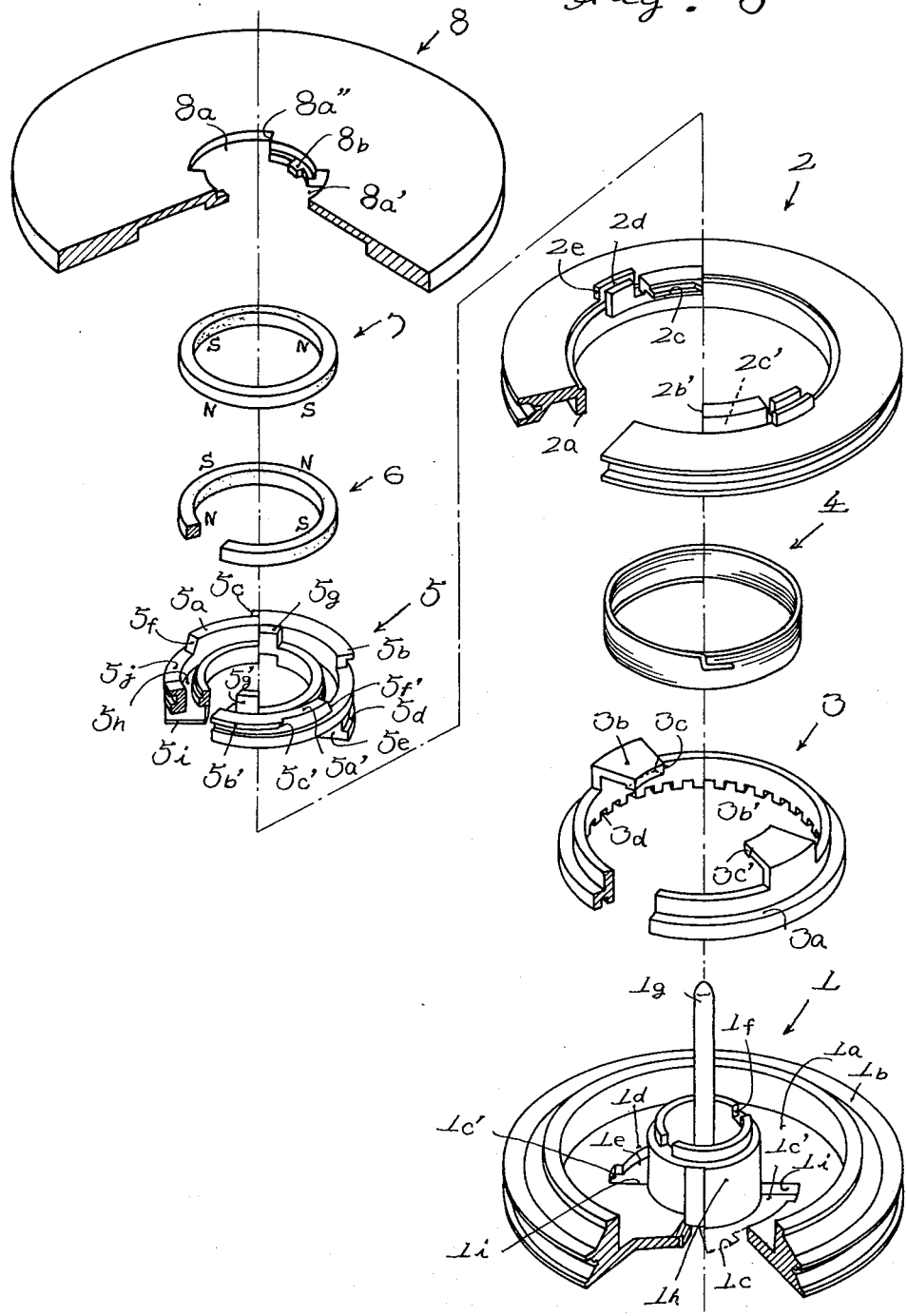
FIG. 3 is a partially cutaway disassembled view showing major parts.

FIG. 2 is a partially cutaway perspective view showing the assembly of the present invention consisting, as shown in FIG. 3, of a fly-wheel 1, pulley 2, spring-hooking ring 3, torsion coil spring 4, operation ring 5, two magnets 6 and 7, holding disc 8 and several parts. Here, the drive member referred to in the present invention represents the aforesaid fly-wheel 4, the detector wheel represents the pulley 5 and the striking member represents the operation ring 5.

First, setups of the afore-mentioned parts and their relations are mentioned below in detail.

The fly-wheel has an annular recess 1a formed in concentric on its upper surface, and to said recess 1a is rotatably and loosely fitted the spring-hook ring 3. On the external periphery of said spring-hook ring 3 is formed a step 3a which comes into contact with the downwardly facing annular edge 2a of the pulley 2 which is slidably fitted to the upper surface 1b of the fly-wheel 1. On the side of the pulley 2 are provided support edges 2c and 2c' that are facing toward the inside and opposingly, said support edges 2c and 2c' being of a cross-sectional L-shape having inclined surfaces 2b and 2b' at one end. The support edges 2c and 2c' detachably support the jaws 5b and 5b' of the projections 5a and 5a' of the operation ring 5 which is rotatably and loosely fitted to the cylindrical boss 1h of the fly-wheel 1. Inclined surfaces 5c and 5c' are formed on the front edge of the jaws 5b and 5b', respectively and are corresponded to the inclined surfaces 2b and 2b' of said pulley. Further on the lower surface and outer side of the operation ring 5 is provided a protrusion 5 e which is designed to protrude having a slidable step 5d. When moved, said protrusion 5e faces toward the hole 1c for protrusion and hole 1c' for retrieval. Said holes 1c and 1c' are arrayed front and back in the rotating direction and are communicated together via a narrow guide hole 1e. Said guide hole 1e is provided with an edge 1d that engages with the slide step 5d said protrusion 5e.

In the space 5j between projection 5a and projection 5a' of the operation ring 5 are interposed protrusions 3b and 3b' that are provided on the spring-hooking ring 3. And the inclined surfaces 3c and 3c' that are formed at one end of the protrusions 3b and 3b' are hutted to the inclined surfaces 5f and 5f' that are provided at one end of said projections 5a, 5a' to thereby form a clutch. The operation ring is further provided with support poles 5g, 5g' which are interposed in the guide grooves 8a, 8a' of the holder disc 8 that is positioned at the uppermost part of the device. The holder disc 8 is pressed with its proturusion 8b to the notch 1f which is formed on the edge of boss of the fly-wheel 1, so that the fly-wheel 1 and the holder disc 8 are assembled as a single unit.

The tortion coil spring 4 is interposed in the annular space S between the operation ring 5 and the spring-hooking ring 3 which surrounds it, and one end of said spring 4 is selectively hooked to the hooking position of the gear-like hooking part 3d of the spring-hooking ring 3. The other end of said spring 4 is hooked to the restriction part 2d of the pulley 2, so that the inclined surfaces 3c, 3c' of the spring-hooking ring 8 that forms said clutch are usually energized to butt to the inclined surfaces 5f, 5f' of the operation ring 5.

The operation ring 5 is further provided with an annular upwardly opening insertion groove 5h into which will be firmly introduced a ring-shaped magnet 6. Another magnet 7 firmly attached to the holder disc 8 is faced downward to the upper surface of said magnet 6 thereby maintaining a small clearance.

The two magnets 6 and 7 are so determined as shown for their polarity that the attractive force and the repulsive force are created between the operation ring 5 and the holder disc 8 as they slide relatively, as will be mentioned later. The referential number 1g in the drawing shows a capstan shaft which also turns the fly-wheel 1.

The automatic stop device (A) constructed as mentioned above, is equipped on the tape recorders, for example, in a manner as schematically shown in FIG. 1.

That is, referring to FIG. 1, a represents a motor, b is an idler. The motor a and the fly-wheel 1 are coupled together through the belt c, the idler b and the pulley 2 are linked by the belt, and while the protrusion 5e is moving, the release lever f is facing thereto to protrude and release the stop plate e of the push-button means. Here, the release lever e corresponds to the release member referred to in the present invention, and symbol g represents a reel bed that comes into contact with said idler b.

Here, if the push-button is operated to turn on the switch to run the tape, and accordingly, if the motor a is turned, the entire automatic stop device (A) rotates in the direction of arrow so that the reel bed g is turned and the tape fed.

Under this condition, one edge 8a'' of the guide groove 8a of the holder disc 8 firmly attached to the fly-wheel comes into collision with the support columns 5g, 5g' of the operation ring 5 to rotate them. Also, under this rotating condition, the projection 5e of the operation ring 5 is at a position of the hole 1c for protrusion, and at this position, the magnets 6 and 7 are in the relation of the same polarity. Therefore, although the operation ring 5 is energized to protrude, the jaws 5b and 5b' of the operation ring 5 are supported by the support edges 2c, 2c' of the pulley 2; therefore, the protrusion 5e is prevented from being protruded and remains retrieved inside of the fly-wheel 1. The inclined surfaces 5f, 5f' of said operation ring 5 are butted to the inclined surfaces 3c, 3c' of the spring-hooking ring 3 to establish the clutch, and the spring-hooking ring 3 is linked to the pulley 2 via the torsion coil spring 4, so that the operation ring 5, spring-hooking ring 3 and the pulley 2 rotate together. That is, said spring 4 detects the force exerted between the fly-wheel and the pulley. Although the operation ring 5 is energized to be disengaged by the clutch action due to the inclination, the jaws 5b, 5b' supported by the support edges 2c, 2c' of the pulley 2 prevent the operation ring 5 from being protruded.

Figure 4:
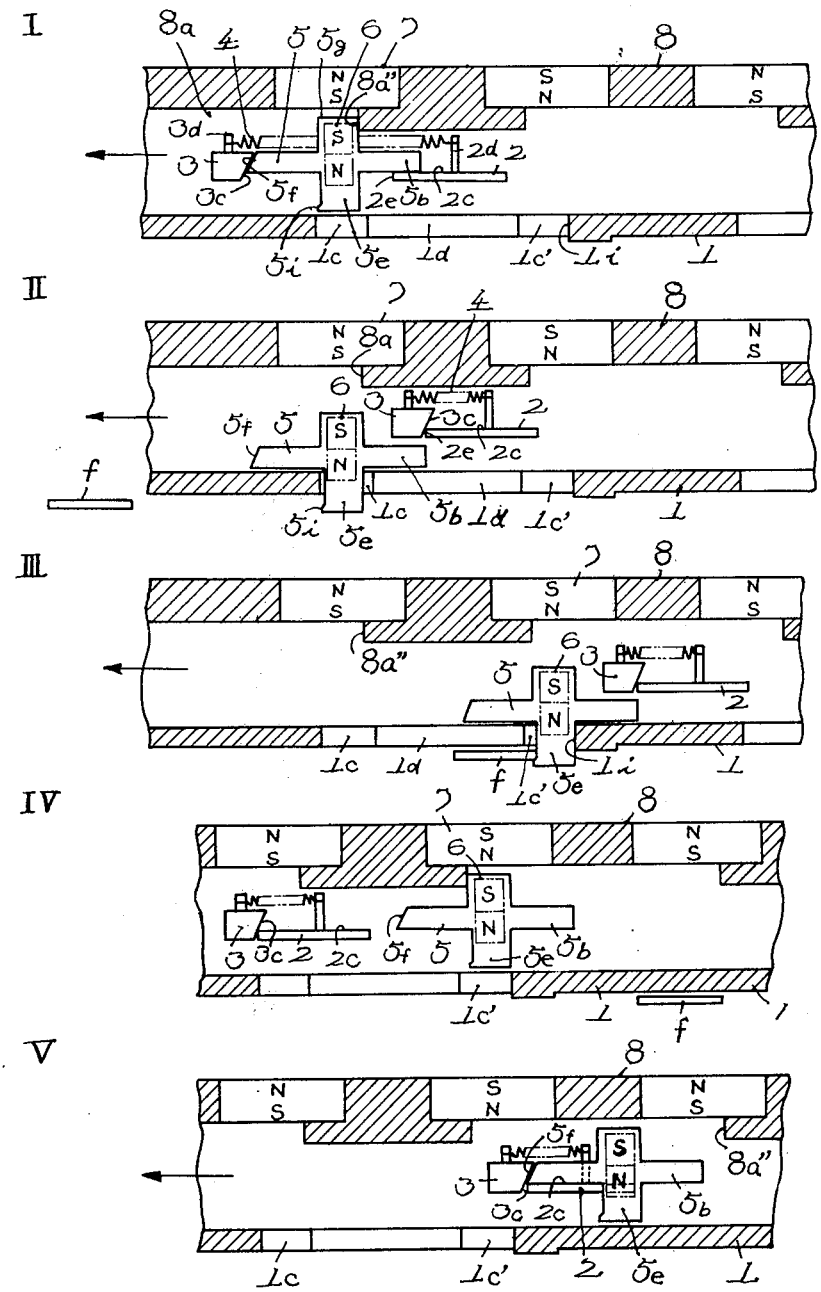
FIG. 4 I to V shows the block diagrams showing the operations conditions.

If now the reel bed g is stopped when the tape winding is finished, the load is applied to the pulley 2 and the pulley 1 stops. In other words, the pulley detects the halt of the reel bed. But even if the pulley were stopped, the fly-wheel 1 continues to turn against the force of the torsion spring and causes the operation ring 5 to turn via a holder disc 8. Then, the jaws 5b, 5b' of the operation ring 5 on the support edges 2c, 2c' of the pulley 2 are disengaged from said support edges 2c, 2c' Then the clutch is disengaged by the replusion of the magnet 7 and the force of the torsion coil spring 4; the operation ring 5 is lowered down immediately, and the projection 5e protrudes through the hole 1c for projection as shown in FIG. 4 II, and the operation ring 5 becomes free. If the flywheel 1 is turned by 90° with the protrusion 5e being protruded, the protrusion 5e comes into contact with the release lever f which is facing to the travel passage of protrusion 5e. The protrusion 5e is then pushed back to the guide hole 1e. When the protrusion 5e is being retrieved, the slidable step 5d of the protrusion 5e engages with the edge 1d. This engagement permits the protrusion 5e without being pulled back to come into contact with the edge 1i of the hole 1c' at the rear via the guide hole 1e, as shown in FIG. 4 III. At this amount, the magnets 6 and 7 may be in the attractive relation. But since the stop jaw 5i of the protrusion 5e is hooked to the release lever f, the protrusion 5e is not pulled back; the edge 1i of the hole 1c' acts to said protrusion 5e to push the protrusion 5e. The release lever f is then striked out strongly to release the push-button means (not shown) via the stop plate e, and the motor a is stopped.

If the protrusion 5e is protruded through the hole 1c as shown in FIG. 4 II, the spring-hooking ring 3 is restored by the force of the torsion coil spring as shown in FIG. 4 III. In effect, part of the inclined surfaces 3c, 3c' come into contact with the end surface 2e of the hooking part 2d of the pulley 2 to be ready for the next operation.

At the position shown in FIG. 4 III, the operation ring 5 projects the release lever f. After the release lever f has been released, there is no contact between the release lever f and the protrusion 5e. Therefore, the operation ring 5 is attracted immediately as shown in FIG. 4 IV, the protrusion 5e is pulled back through the port 1c' and the inclined surfaces 5f, 5f' of the operation ring 5 come to butt or become ready to butt to the inclined surfaces 3c, 3c' of said spring-hooking ring 3 which is standing by in the restored state. At the same time, the jaws 5b, 5b' rise on or are ready to rise on the support edge 2c, 2c' of the pulley 2 via the inclined surfaces 5c, 5c' and through the inclined surfaces 2b, 2b'. That is, the operation finishes its one cycle with the clutch engaged. Or otherwise, the clutch restores to the engaged state when the tape is fed again.

Next, if the device is started again under the condition of FIG. 4 IV for the purpose of feeding the tape, the fly-wheel 1 and the holder disc 8 start to rotate together. At the moment, since the ring 5 has been attracted by the magnets 6 and 7, said ring 5 undergoes rotation together, and the jaws 5b, 5b' of the operation ring 5 are supported by the support edges 2c, 2c' of the pulley 2 which is stationary as shown in FIG. 4 V, and then the inclined surfaces 5f, 5f' collides to the inclined surfaces of the spring-hooking ring 3 which has been retrieved. The operation ring is then stopped, and under this condition, one edge 8a" of the holder disc 8 collides to the operation ring to push it, and attains the state of tape feeding shown in FIG. 4 I and feeds the tape.

Figure 6:
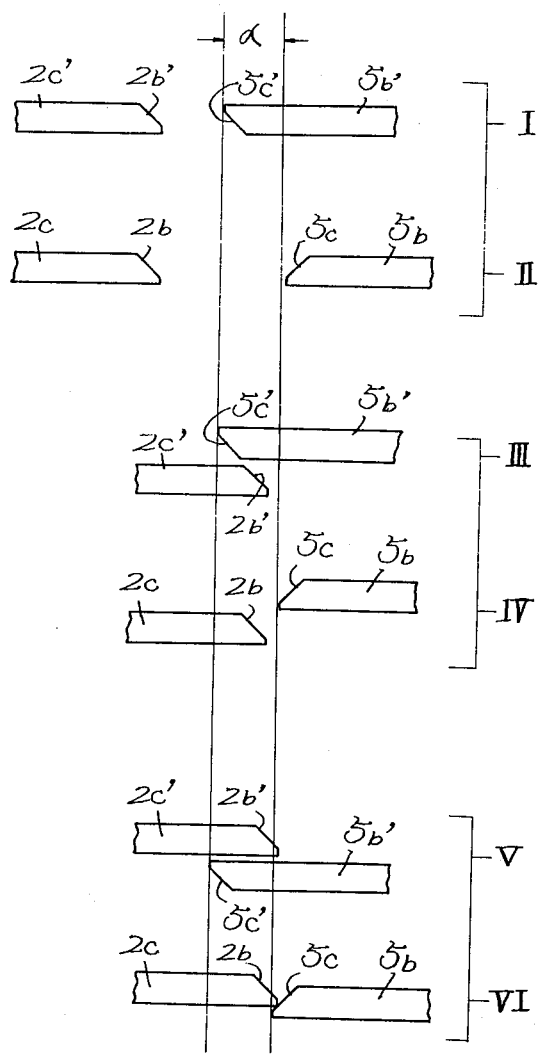
FIG. 6 I is a cross-sectional view of line A—A of FIG. 5.

By the way, the directions of the inclined surfaces 2b, 2b' of said support edges 2c, 2c' and the inclined surfaces 5c, 5c' of the jaws 5b, 5b' are as shown in FIG. 6 I, II.

Figure 5:
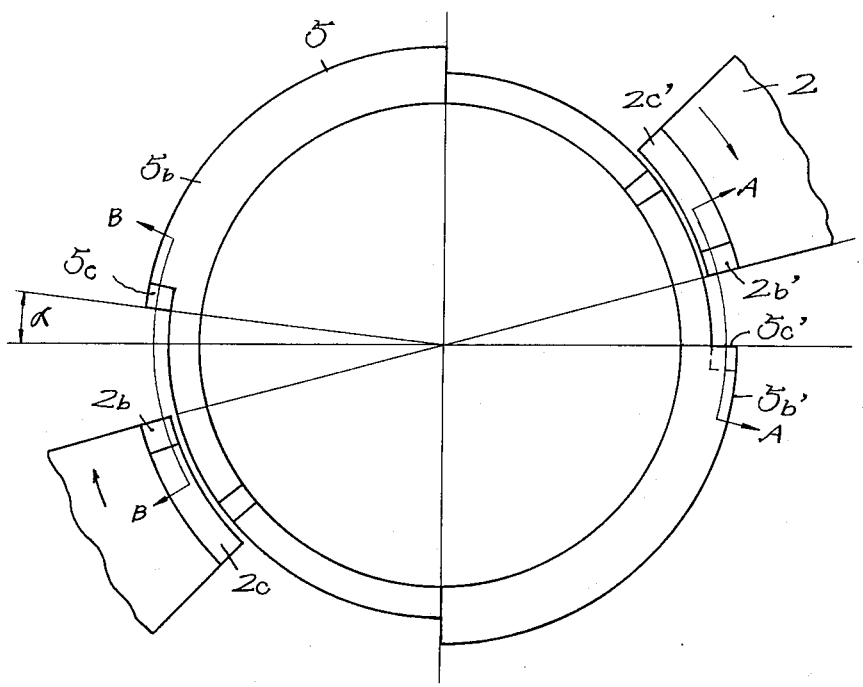
FIG. 5 is a plan view showing the relation between the operation ring (striking member) and the pulley (detector wheel)

Diagram I of FIG. 6 shows the cross section A—A of FIG. 5, and diagram II shows the cross section B—B.

As will be apparent from these diagrams, one side, i.e., the inclined surface 2b' and the corresponding inclined surface 5c' are in parallel as shown in FIG. 6 I, and the inclined surface 2b on the other side and the corresponding inclined surface 5c are oppositely arrayed as shown in FIG. 6 II. Besides, the starting end of one inclined surface 5c' is aligned on the central axis, but the starting end of the other inclined surface 5c is deviated a little (angle α) from the central axis.

Such an arrangement is employed for the purpose that there will be no abnormal engagement between the operation ring and the pulley even in an event the operation ring 5 failed to reach the normal position. When operating normally, the operation ring 5 have to be pulled back in parallel by the attractive force of the magnet under the state shown in FIG. 4 IV, i.e., when the release lever f is detached from the protrusion 5e of the operation ring 5.

FIG. 6 III–VI show the state in which the inclined surfaces of the operation ring are not reaching the contacting position with the corresponding inclined surfaces. In the diagrams III, IV, the inclined surface 2b' of the pulley 2 lifts up the inclined surface 5c' of the operation ring 5, and in this condition, if the inclined surface 5c' is lifted up by the support edge 2c' of the pulley, the increased attractive force of the magnet also attracts the inclined surface 5c and elevated to the position higher than the inclined surface 2b of support edge 2c of said pulley; the operation ring is then reliably supported by the support edge of the pulley.

Diagrams V and VI in FIG. 6 show the state in which the inclined surfaces 5c, 5c' of the operation ring are inclined on the plane, and the inclined surface 5c' is positioned lower than the support edge 2c'. At this moment, the other inclined surface 5c collides to the tip of the inclined surface 2b of the other support edge 2c of the pulley and pushed downward; therefore, the operation ring 5 is never supported by said support edges 2c, 2c'.

In effect, employment of the above-mentioned means helps prevent such failures that one of the jaws 5c, 5c' of the operation ring is supported by the support edge 2c or 2c' of the pulley but the other jaw is not supported, or one of them is not supported but the other one is supported.

The afore-mentioned embodiment of the present invention employed a magnet as means of projecting and retrieving the operation ring. But this is only one example; for example, a thin resilient member may be employed to attain the same function. In effect, according to the present invention, any appropriate means may be employed so that the operation ring is protruded at a position at which the protrusion 5e of the operation ring 5 is faced to one hole 1c for protrusion and retrieved at a position when the protrusion 5e of the operation ring 5 is faced to the hole 1c' for retrieval. Also, employing the clutch which is always energized to be disengaged as mentioned in the foregoing embodiment, there is no need of providing a particular energizing means at the position of hole 1c for protrusion.

What is claimed is:

1. An automatic stop device for use with a tape recorder comprising: a fly-wheel which is directly coupled to a drive power source for rotation in conjunction therewith; a detector wheel supported in concentric relationship with said fly-wheel, said detector wheel being coupled with a tape feeding member; clutch means coupling said fly-wheel with the detector wheel so as to allow relative rotational slip between said two wheels responsive to a load greater than a predetermined magnitude being applied to said detector wheel; a striking member protruding in a axial direction responsive to said relative rotational slip so as to cause said wheels to come into collision with a member which is operatingly connected with a playback button of the tape recorder, and being displaced by said member so that the rotational force of said striking member is directly coupled to the fly-wheel at said displaced position; means retracting said striking member after said striking member has struck out said member to thereby release said playback button; and a clutch element of said clutch means being directly positioned on said striking member.

2. An automatic stop device as claimed in claim 1, wherein opposite clutch elements of said clutch means are normally urged away from each other.

3. An automatic stop device as claimed in claim 1, means for normally preventing the striking member from being protruding upon said detection wheel making a rotation in unison with said fly-wheel, said means being released responsive to said relative rotational slip caused between the detector wheel and the fly-wheel.

4. An automatic stop device as claimed in claim 2, comprising a permanent magnet being attached to the striking member and a permanent magnet of the same polarity being oppositely arranged on the fly-wheel.

5. An automatic stop device as claimed in claim 4, comprising a stopper means at said displaced position for causing said striking member to abut against said stopper means and retract to its normal condition.

6. An automatic stop device as claimed in claim 5, wherein the striking member is retracted by the attractive force of the permanent magnets when said striking member is positioned at said stopper means.

7. An automatic stop device as claimed in claim 6, wherein one of said permanent magnets is provided on the striking member and another of the permanent magnets is arranged at a position opposite to said first-mentioned permanent magnet.

8. An automatic stop device as claimed in claim 7, comprising a permanent magnet on the striking member; and a magnetizable member disposed at a position opposite said permanent magnet.

9. An automatic stop device as claimed in claim 8, said magnetizable member being arranged on the striking member and said permanent magnet being disposed at a position opposite said magnetizable member.

10. An automatic stop device as claimed in claim 1, comprising resilient means imparting said protruding and retracting motions to said striking member.

* * * * *